Patented July 27, 1948

2,445,919

UNITED STATES PATENT OFFICE 2,445,919

APPARATUS FOR COOKING RESINS

William Arthur Mitchell, Buckland, Betchworth, England

Application April 12, 1945, Serial No. 588,036
In Great Britain February 24, 1944

1 Claim. (Cl. 23—290.5)

This invention relates to the heat treatment of natural resins, for instance in connection with the production of varnishes, an operation which is normally referred to as "gum running."

The general practice is to heat treat natural resins and particularly copals in order to render them oil soluble in open or closed cylindrical kettles or pots, the major axis of which is arranged vertically the kettle or pot being directly heated and in some cases furnished with an agitator.

The use of such kettles presents a number of disadvantages in that, for example, natural copals contain varying amounts of foreign and mineral matter which, having a higher specific gravity than the melted resin sticks to the bottom of the kettle causing overheating of the bottom and a shortened life of the kettle and also overheating of the resin resulting in unnecessary losses and darkening thereof.

Further, where an agitator is provided it is usual to arrange a bearing at the bottom of the kettle for the agitator shaft. Owing to the fact that it is impossible to lubricate this bearing, rapid wear takes place.

Further, consideration of the ratio of heating surface to the capacity of the kettle places a practical limit on the size of kettle that can be constructed.

The object of the invention is to provide a process and apparatus which will not present these disadvantages.

The invention consists in heat treating natural resins and particularly copal in a cylindrical kettle, the major axis of which extends in a generally horizontal direction arranged in a setting in which it is heated from below, the heated side or the base of the kettle being inclined in a downward direction from the hottest part of the kettle to the forward or cooler end.

Within the kettle there may be provided an agitator secured to a shaft extending through its end walls and preferably supported in bearings external to the kettle.

Preferably, in carrying the invention into effect an atmosphere of carbon dioxide or other neutral gas is maintained in the kettle.

The invention further consists in apparatus for the heat treatment of natural resins or gum running constructed and arranged as above defined.

The inclination of the base of the kettle possesses the advantage that any mineral matter separating tends to collect on the cooler and lower portion of the base of the kettle.

Optionally, the setting may be such that the forward and lower portion of the bottom of the kettle extends beyond the setting and is thus external to the setting.

By the provision of bearings external to the kettle, these may be adequately lubricated.

By the arrangement of the kettle with its major axis extending longitudinally, a better ratio of heating surface to volume of the kettle may be secured.

Furthermore, in view of the greater length of the kettle which is thus made possible, continuous operation may be carried out by feeding the natural resin in at one end and discharging the heat treated resin at the other.

The invention will be described further in detail and by way of example with reference to the accompanying drawings, in which.

Figure 1:
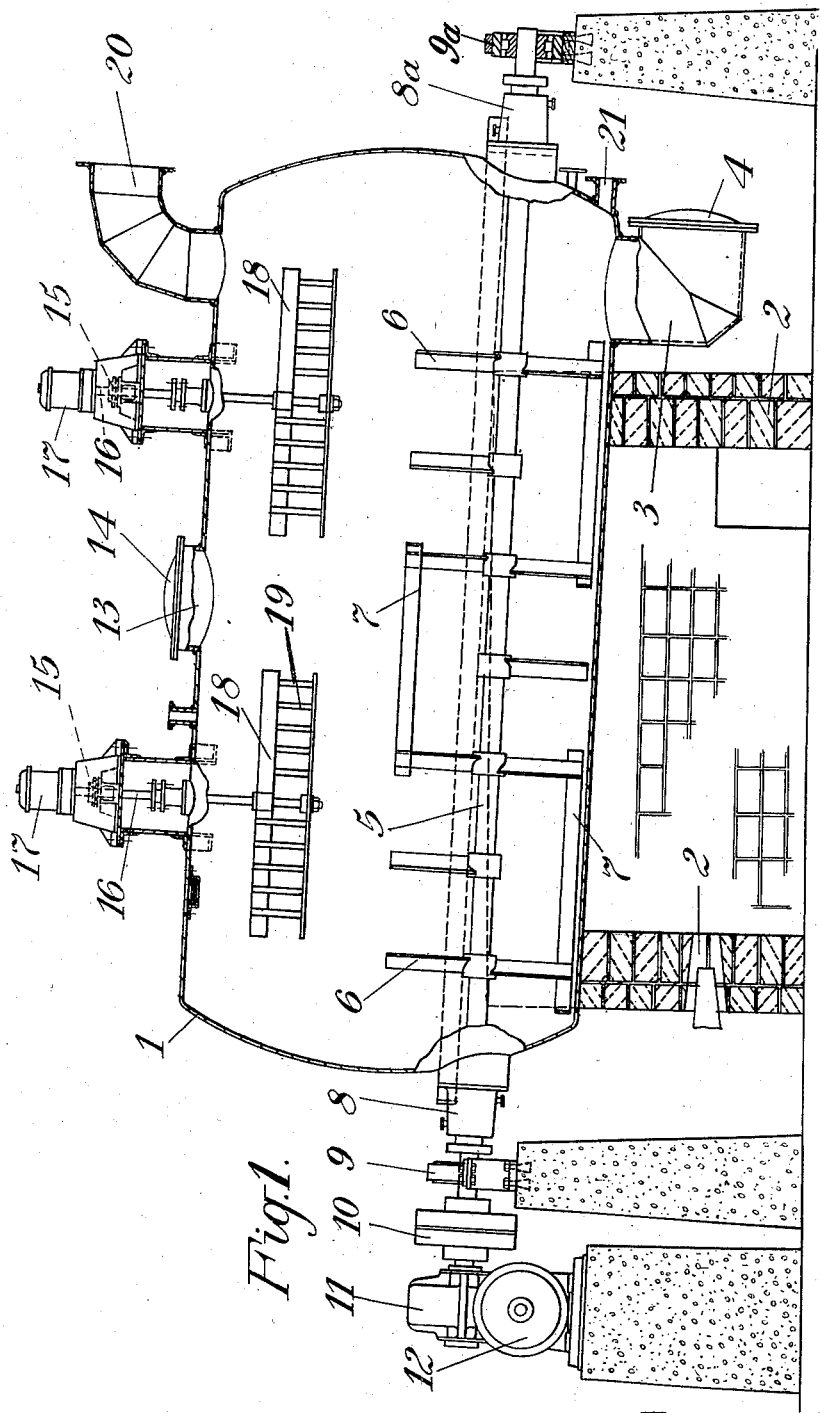
Figure 1 is a view in end elevation.
Figure 2:
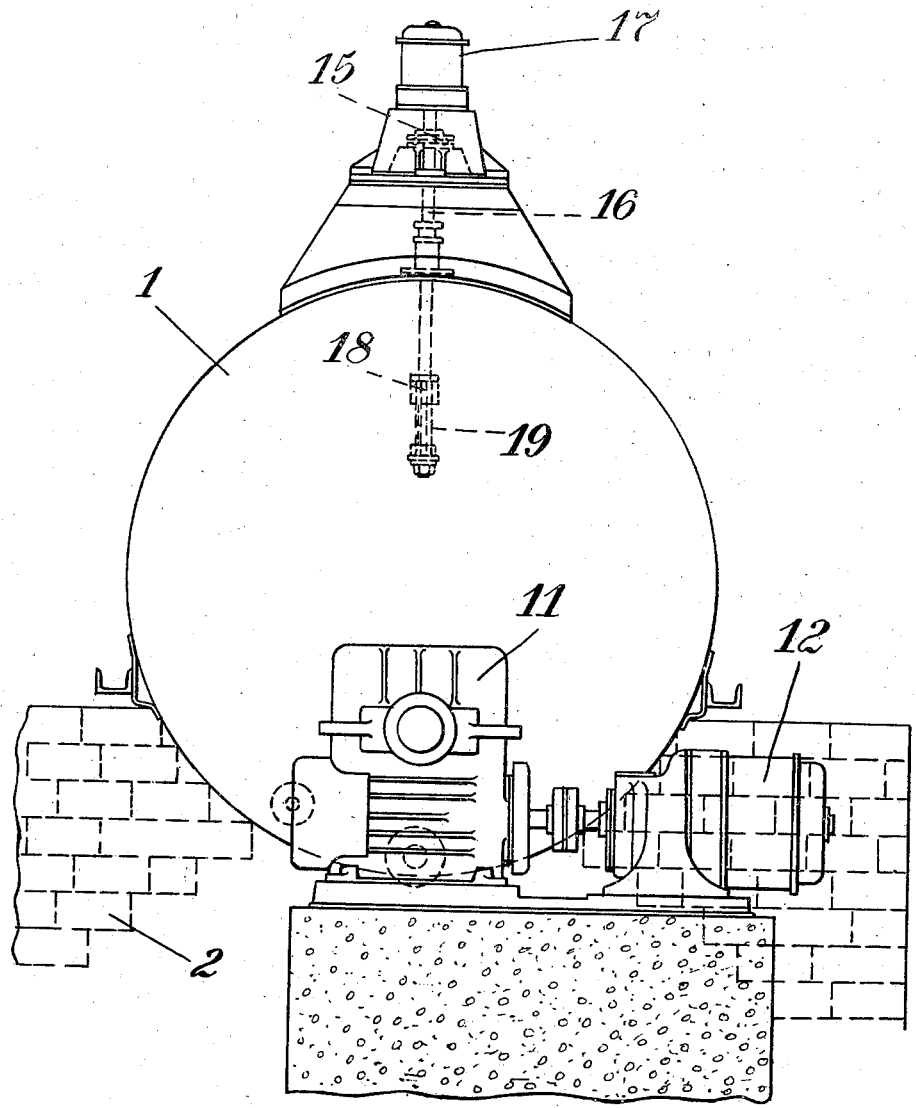
Figure 2 is a longitudinal section of an apparatus in accordance with the invention.

As will be seen from the drawings, the apparatus comprises a vessel 1 constituting a kettle arranged on a furnace setting 2 so that it is slightly inclined downward so that any mineral matter separating from the resin treated tends to collect on the cooler and lower portion of the base of the vessel and may be delivered into the chamber 3 which is furnished with a manhole 4.

In the construction shown, as will be seen, the setting is such that the forward and lower portion of the bottom of the kettle extends beyond it and is thus external to the setting.

Through the vessel extends a shaft 5 furnished with twisted blades 6 some of which are connected by longitudinally extending members 7.

This shaft is mounted in water cooled stuffing boxes 8, 8a and is supported in roller bearings 9, 9a, wholly external to the setting and the vessel.

In the construction shown the shaft is connected through a flexible coupling 10 with a reducing gear 11 driven by a motor 12 so that the shaft may be rotated at a speed of, for instance, between 15–30 revolutions per minute.

The upper part of the kettle is provided with a manhole 13 furnished with a cover 14 by which access to the interior of the kettle may be secured and, further, in the upper portion there are provided, in bearings 15 external to the vessel, shafts 16 each connected with a motor 17, the other end of the shaft being connected with a flat bar 18 to which are secured a number of similar bars or strips 19, and functioning as a froth breaker.

In the upper portion of the wall of the vessel there is also provided a vapour outlet 20, and on the forward end of the vessel there is provided an outlet pipe 21 to enable the fused gum to be withdrawn.

I claim:

Apparatus adapted for use in heat treating natural resins and particularly copal, comprising a closed cylindrical vessel having an inclined axis to the horizontal, a furnace setting in which the cylindrical vessel rests so that only the under portion of the vessel is heated, with the lower end of the vessel extending out beyond the setting, an inlet for the material to be treated adjacent to the upper part of the vessel, an outlet for the withdrawal of the molten resin in the lower portion of the lower end wall of the vessel, a well dependent from and opening into the lower bottom portion of the vessel external to the furnace setting, and an agitator provided in the portion of the vessel which is substantially within the setting.

WILLIAM ARTHUR MITCHELL.

REFERENCES CITED

The following references are of record in the file of this patent:

UNITED STATES PATENTS

| Number | Name | Date |
|---|---|---|
| 393,079 | Rumpf | Nov. 20, 1888 |
| 406,868 | Bartlett | July 16, 1889 |
| 1,001,937 | Ellis | Aug. 29, 1911 |
| 1,288,400 | Fickes | Dec. 17, 1918 |
| 1,358,383 | Metzger | Nov. 9, 1920 |
| 2,021,991 | Depew | Nov. 26, 1935 |

FOREIGN PATENTS

| Number | Country | Date |
|---|---|---|
| 419,952 | Great Britain | Nov. 22, 1934 |

OTHER REFERENCES

Mantell et al.: "Technology of Natural Resins," 1942, pp. 193-206.